(12) United States Patent
Lutz (10) Patent No.: US 11,901,970 B1
(45) Date of Patent: Feb. 13, 2024

(54) NEAR-FIELD COMMUNICATION FUNCTIONALITY FOR PARTIAL APPLICATIONS ACCESSED OVER A NETWORK

(71) Applicant: Capital One Services, LLC, McLean, VA (US)

(72) Inventor: Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/053,129

(22) Filed: Nov. 7, 2022

(51) Int. Cl.
| | |
|---|---|
| G06F 15/16 | (2006.01) |
| H04B 5/00 | (2006.01) |
| H04L 9/40 | (2022.01) |
| G06K 7/10 | (2006.01) |
| H04L 67/568 | (2022.01) |
| H04L 67/146 | (2022.01) |

(52) U.S. Cl.
CPC ....... H04B 5/0031 (2013.01); G06K 7/10297 (2013.01); H04L 63/083 (2013.01); H04L 67/146 (2013.01); H04L 67/568 (2022.05)

(58) Field of Classification Search
CPC ... H04B 5/0031; H04B 5/0025; H04L 67/568; H04L 63/083; H04L 67/146; G06K 7/10297
USPC ................................. 709/227, 217, 203, 226
See application file for complete search history.

(56) References Cited

U.S. PATENT DOCUMENTS

| | | | | |
|---|---|---|---|---|
| 8,954,004 | B1* | 2/2015 | Wang | G06F 21/41 |
| | | | | 455/410 |
| 11,308,747 | B1* | 4/2022 | Sahani | G07C 9/27 |
| 2014/0378204 | A1* | 12/2014 | Michel | G07F 17/329 |
| | | | | 463/17 |

(Continued)

FOREIGN PATENT DOCUMENTS

EP        2487875 A2      8/2012

OTHER PUBLICATIONS

Francois Beaufort, "Interact with NFC devices on Chrome for Android," WebDev, Website: https://web.dev/nfc/; Feb. 12, 2020 (Updated Jan. 27, 2022), 28 Pages.

(Continued)

*Primary Examiner* — Kaylee J Huang
(74) *Attorney, Agent, or Firm* — Harrity & Harrity, LLP (57) ABSTRACT

In some implementation, a device may execute a web-browsing application installed on the device. The device may scan, by a near-field communication (NFC) reader of the device and in connection with the web-browsing application, an NFC tag of an interaction card associated with an account of a user. The device may receive, from the interaction card, data associated with the account of the user. The device may store the data as coded data in the web-browsing application. The device may generate a uniform resource locator (URL) associated with a partial application having reduced functionality. The URL may include one or more URL parameters containing the coded data. The device may launch the partial application based on a user interaction with a hyperlink associated with the URL. The partial application may parse the URL parameter(s) and may decode the coded data to be used by the partial application.

20 Claims, 7 Drawing Sheets

(56) References Cited

U.S. PATENT DOCUMENTS

| | | | |
|---|---|---|---|
| 2015/0002870 A1* | 1/2015 | Burke, Jr. | G06F 3/1268 |
| | | | 358/1.13 |
| 2016/0239284 A1* | 8/2016 | Boudville | H04L 67/34 |
| 2020/0250672 A1* | 8/2020 | Rule | G06Q 20/382 |
| 2021/0099868 A1* | 4/2021 | Damlaj | H04L 67/146 |
| 2021/0318888 A1 | 10/2021 | Abbasian et al. | |
| 2022/0138726 A1 | 5/2022 | Rule et al. | |

OTHER PUBLICATIONS

International Search Report and Written Opinion for Application No. PCT/US2023/076095, dated Dec. 18, 2023, 10 pages.

* cited by examiner

FIG. 5 though the user may click a link (e.g., in a browser or in an application store installed on the user device), which may launch the application over the network. The user may have limited use of the application (e.g., only key features of the application). Such a feature may be desirable for an application that the user infrequently needs and/or for which the user only needs specific features such that installation of the application may unnecessarily use memory and/or computing resources of the user device. However, in some scenarios, the partial use of the application may prevent other features of the user device from being used with the application that would otherwise be accessible if the application was installed on the device. One example of such a feature may be near-field communication (NFC) functionality of the user device. As a result, the partial use of the application may be incompatible with other extrane-

NEAR-FIELD COMMUNICATION FUNCTIONALITY FOR PARTIAL APPLICATIONS ACCESSED OVER A NETWORK

BACKGROUND

Near-field communication (NFC) includes a set of communication protocols that permit two electronic devices to communicate. NFC devices may be used in contactless payment systems. Additionally, or alternatively, NFC devices may be used for social networking, such as for sharing contacts, photos, videos, and/or files. Additionally, or alternatively, NFC devices may function as electronic identity documents and/or keycards.

SUMMARY

Some implementations described herein relate to an NFC device to provide NFC functionality for partial applications accessed over a network. The NFC device may include an NFC reader, one or more memories, and one or more processors communicatively coupled to the one or more memories. The one or more processors may be configured to execute a web-browsing application installed on the one or more memories. The one or more processors may be configured to scan, by the NFC reader and in connection with the web-browsing application, an NFC tag of an interaction card associated with an account of a user. The one or more processors may be configured to receive, from the interaction card, data associated with the account of the user. The one or more processors may be configured to store the data in the web-browsing application. The one or more processors may be configured to launch, based on a user interaction with a hyperlink presented in the web-browsing application, a partial application associated with the hyperlink and accessed over the network. The one or more processors may be configured to retrieve, based on a request from the partial application, the data stored in the web-browsing application to be used by the partial application.

Some implementations described herein relate to a method of providing NFC functionality for applications accessed over a network. The method may include executing, by a first NFC device having one or more processors, a first application installed on the NFC device. The method may include scanning, by an NFC reader of the NFC device and in connection with executing the first application, an NFC tag of a second NFC device. The method may include receiving data by the first NFC device and from the second NFC device. The method may include storing, by the NFC device, the data. The method may include launching, by the NFC device, a second application accessed over the network, where the second application omits NFC functionality. The method may include retrieving, by the NFC device and based on a request from the second application, the data to be used by the second application.

Some implementations described herein relate to a non-transitory computer-readable medium that stores a set of instructions for a first NFC device. The set of instructions, when executed by one or more processors of the first NFC device, may cause the first NFC device to execute a web-browsing application installed on the first NFC device. The set of instructions, when executed by one or more processors of the first NFC device, may cause the first NFC device to scan, by an NFC reader of the first NFC device and in connection with the web-browsing application, an NFC tag of a second NFC device. The set of instructions, when executed by one or more processors of the first NFC device, may cause the first NFC device to receive data from the second NFC device based on scanning the NFC tag. The set of instructions, when executed by one or more processors of the first NFC device, may cause the first NFC device to store the data in connection with the web-browsing application. The set of instructions, when executed by one or more processors of the first NFC device, may cause the first NFC device to detect a user interaction with a hyperlink presented in the web-browsing application. The set of instructions, when executed by one or more processors of the first NFC device, may cause the first NFC device to launch the partial application based on the user interaction with the hyperlink. The set of instructions, when executed by one or more processors of the first NFC device, may cause the first NFC device to retrieve, based on a request from the partial application, the data stored in connection with the web-browsing application.

DETAILED DESCRIPTION

The following detailed description of example implementations refers to the accompanying drawings. The same reference numbers in different drawings may identify the same or similar elements.

A user of a user device (e.g., a mobile phone) may have a capability to partially use an application accessed over a network rather than having the application installed on the user device. For example, the user may click a link (e.g., in a browser or in an application store installed on the user device), which may launch the application over the network. The user may have limited use of the application (e.g., only key features of the application). Such a feature may be desirable for an application that the user infrequently needs and/or for which the user only needs specific features such that installation of the application may unnecessarily use memory and/or computing resources of the user device. However, in some scenarios, the partial use of the application may prevent other features of the user device from being used with the application that would otherwise be accessible if the application was installed on the device. One example of such a feature may be near-field communication (NFC) functionality of the user device. As a result, the partial use of the application may be incompatible with other extraneous devices (e.g., interaction cards) that incorporate such features (e.g., NFC) to interact with the user device via the application. Accordingly, it is desirable for a way to utilize features and functionalities of the user device with the partial applications such that the memory and/or computing resources may still be conserved by not having the full application installed on the user device.

Some implementations described herein relate to a device via which a user may access a partial application (e.g., an application accessed over a network and not installed on the user device) while still being able to have NFC functionality with the partial application. The device may execute a web-browsing application installed on the device. A website opened on the web-browsing application may provide instructions to scan, via an NFC reader of the device, an NFC tag of another device (e.g., an interaction card). By way of the scan, the device may receive, from the other device, some data stored on the other device. In connection with the web-browsing application and the website, the device may store the data in the web-browsing application (e.g., in the software code, Javascript, etc.). The device then may generate a uniform resource locator (URL) associated with the partial application and that includes one or more URL parameters containing the stored data. The device may then launch the partial application via the web-browsing application. After the partial application has launched, and based on the URL (e.g., the URL parameters), the partial application may access and use the data for a particular use or feature of the partial application.

In this way, the partial application may indirectly be able to have NFC functionality by accessing information previously received over NFC and stored via another application (e.g., the web-browsing application). Accordingly, memory and/or computing resources of the device may still be conserved by not having the full application installed on the device while still having access to NFC functionality of the device for the partial application.

Figure 1A:
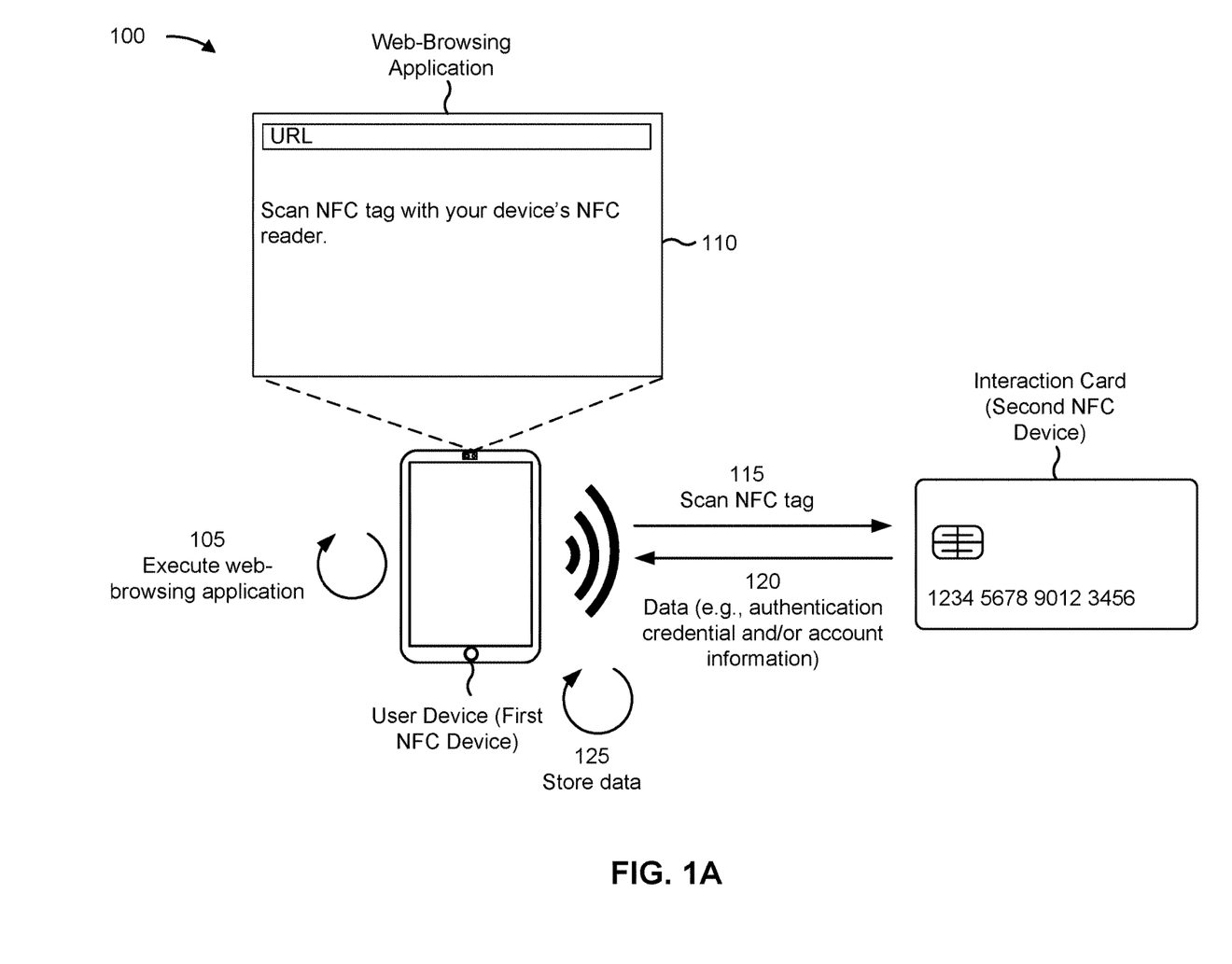
FIGS. 1A-1C are diagrams of an example associated with near-field communication functionality for partial applications accessed over a network, in accordance with some embodiments of the present disclosure.
Figure 1B:
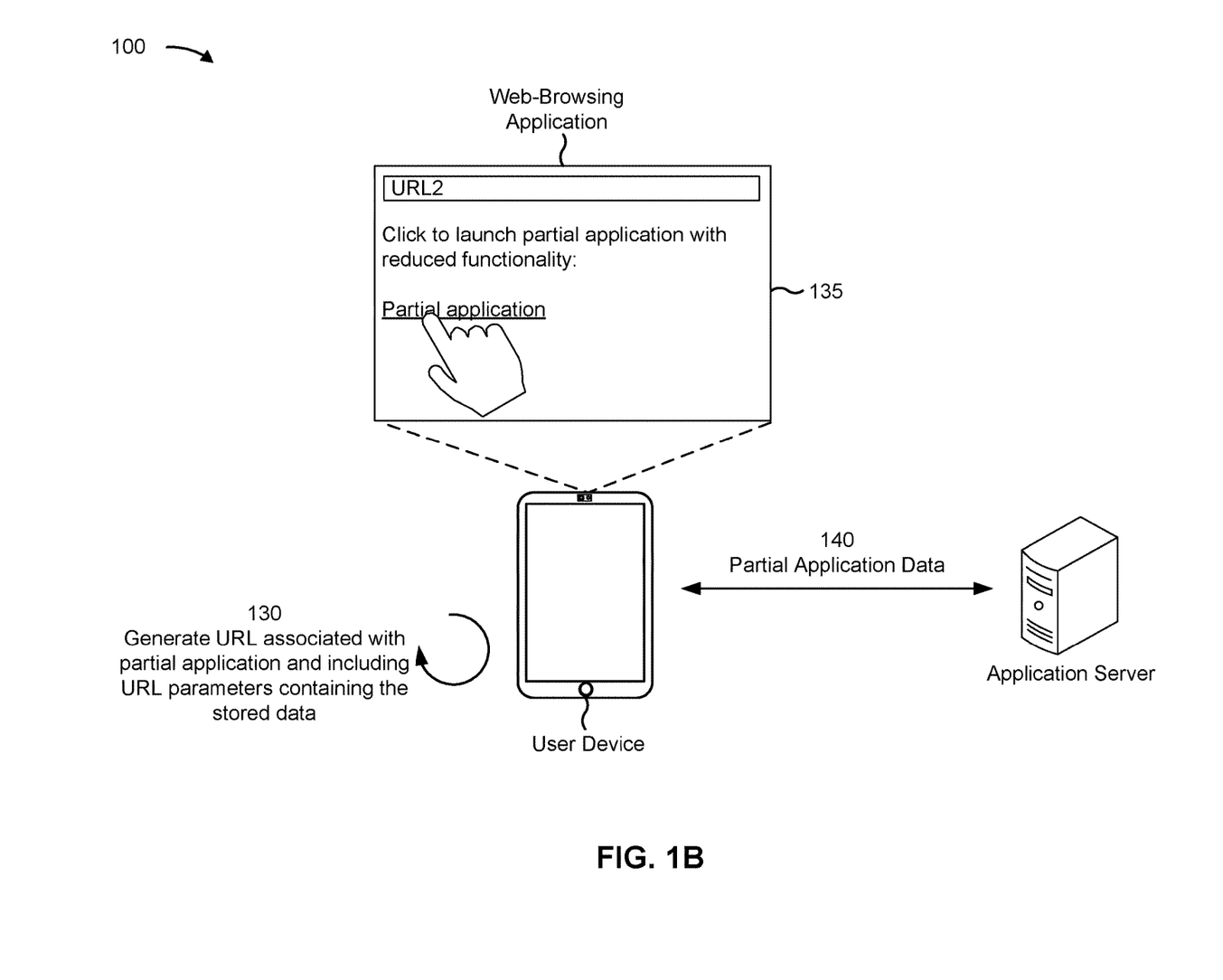
Figure 1C:
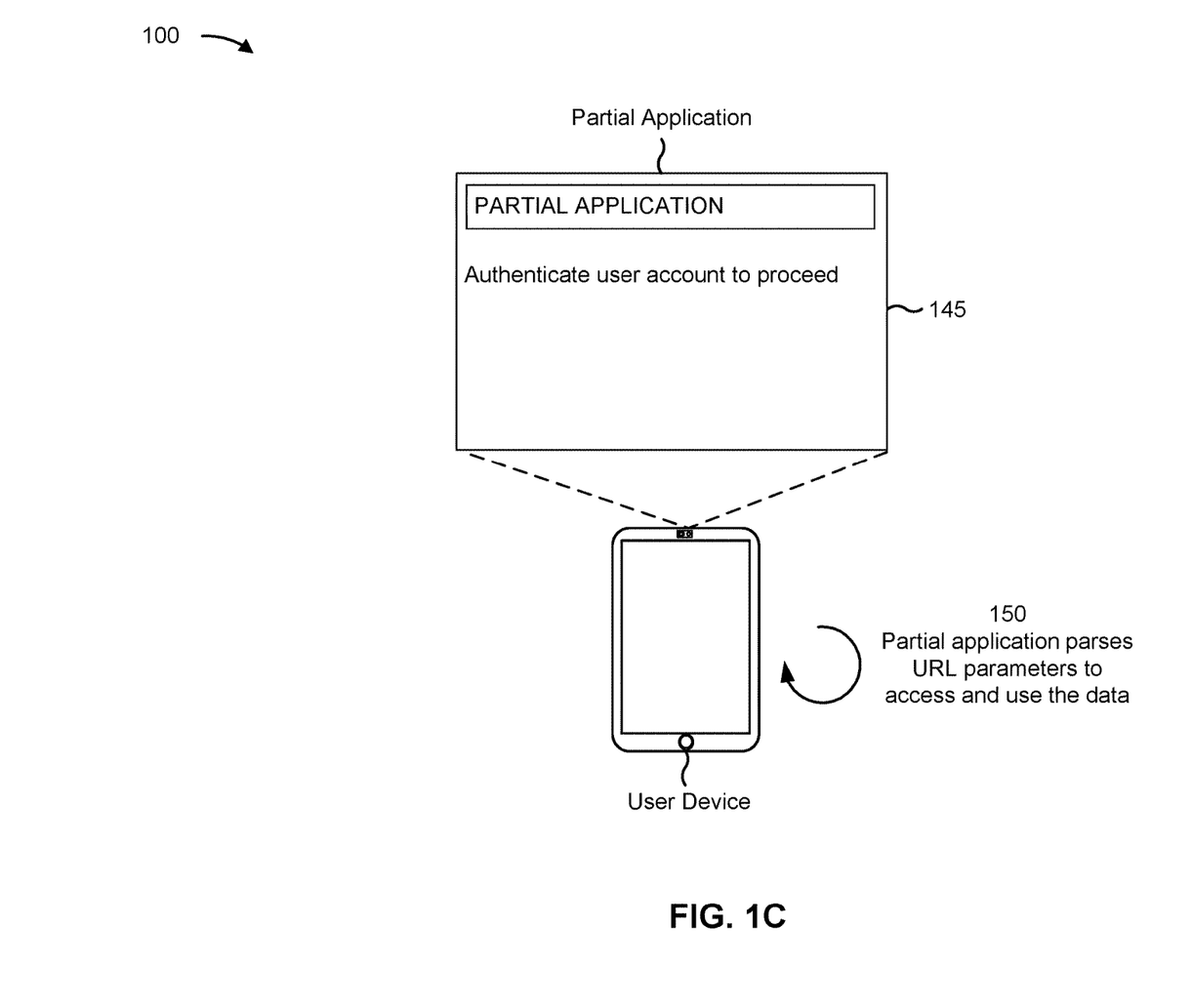

FIGS. 1A-1C are diagrams of an example 100 associated with near-field communication functionality for partial applications accessed over a network. As shown in FIGS. 1A-1C, example 100 includes a user device, an interaction card, and an application server. These devices are described in more detail in connection with FIGS. 2 and 3.

As shown in FIG. 1A, and by reference number 105, a user device (also referred to as a first NFC device) may execute a first application installed on the user device. In some scenarios, the first application may be a web-browsing application. In such scenarios, as shown by reference number 110, the user device may open, via the web-browsing application, a particular uniform resource locator (URL) associated with a particular website. The URL may have software code that provides for and/or enables use of NFC functionality of the user device. For example, as shown by reference number 110, the web-browsing application may display a user interface (UI) associated with the URL and that provides instructions for scanning an NFC tag of another device.

As shown by reference number 115, in connection with the UI, the user device may scan an NFC tag of another NFC device (also referred to as a second NFC device), such as an interaction card (e.g., a transaction card). For example, the user device may be brought into close proximity to the second NFC device to provide power to the other second NFC device (e.g., via electromagnetic induction). The second user device may have information stored on the second NFC device. The information may be any information stored in an NFC data exchange format (NDEF). For example, the information may be associated with a user and/or a user account of the user, such as an account identifier associated with the user account (e.g., an account ID number, a primary account number (PAN), or a virtual card number), an authentication credential (e.g., authentication token) associated with the user or the user account, user information (e.g., user name), or the like.

As shown by reference number 120, based on scanning the NFC tag and/or powering the second NFC device, the second NFC device may transmit, and the user device may receive, data indicating the information stored on the second NFC device (e.g., the authentication credential and/or account information). The data may be transmitted and received via NFC antennas, as described in more detail below in connection with FIG. 3.

As shown by reference number 125, the user device may store the data received from the second NFC device. In some implementations, the user device may store the data in and/or in connection with the web-browsing application. For example, the data may be stored in the software code (e.g., Javascript) associated with the web-browsing application (e.g., as cookies). In some implementations, the data may be stored temporarily (e.g., the data may be accessible for a threshold amount of time). Additionally, or alternatively, the data may be stored permanently on the user device (e.g., on one or more memories of the user device). In some implementations, the data may be stored as coded data (e.g., via URL encoding, percent encoding, or ASCII encoding).

As shown in FIG. 1B, and by reference number 130, user device may generate a URL associated with an application (referred to as a partial application or a second application) accessible over a network. The partial application may be an application that is not installed on the user device and that may have limited functionality (e.g., no NFC functionality) compared to a full version of the application if installed on the user device. The partial application may be launched from another application (e.g., the web-browsing application) installed on the user device. For example, as shown by reference number 135, the web-browsing application may present (e.g., on a UI associated with a URL, such as a search engine) a hyperlink to the URL associated with the partial application (also referred to as the partial application URL). The URL associated with the UI may be the same as or may be different from the URL in connection with which the NFC tag was scanned. The user device may detect a user interaction with the hyperlink (e.g., a physical touching or pressing of the hyperlink on a touchscreen of the user device). As shown by reference number 140, based on detecting the user interaction, the user device may establish a connection with an application server (e.g., over the network) associated with the partial application. The application server may be a system and/or server, such as an application store, that may store, provide, host, and/or manage data associated with the partial application (referred to as partial application data) that indicates a partial version of the application with reduced features (e.g., one or more fewer features and/or functionality, such as NFC functionality, than a full version of the application if installed on the user device). Based on the connection, the application server may transmit, and the user device may receive, the partial application data.

As shown in FIG. 1C, and by reference number 145, the user device may launch the partial application based on the partial application URL (e.g., the user interaction with the hyperlink associated with the partial application URL). In some implementations, the partial application may be launched by and/or executed within the web-browsing application. As shown in FIG. 1C, the partial application may request and/or require some data and/or information in connection with one or more features associated with the partial application. For example, the partial application may require authentication of the user and/or the user account. Additionally, or alternatively, the partial application may require account and/or user information (e.g., the user name and/or the account identifier). As shown by reference number 150, after the partial application is launched, the partial application may access and use the data obtained from the second NFC device and stored in connection with the web-browsing application and/or based on the partial application URL. For example, the partial application may parse the one or more URL parameters to obtain the data and/or may decode the data (e.g., when the data is stored as coded data). Because the partial application may be launched by and/or executed within the web-browsing application and based on the partial application URL, the data stored in connection with the web-browsing application may be accessed and used by the partial application. In this way, the partial application may still obtain and use information accessed over NFC despite not having NFC functionality.

As described above, the user device may access a partial application (e.g., an application accessed over a network and not installed on the user device) while still being able to have NFC functionality with the partial application. The user device may execute a web-browsing application installed on the user device, and may scan an NFC tag of another device in connection with a URL opened on the web-browsing application. By way of the scan, the user device may receive, from the other device, some data stored on the other device. In connection with the web-browsing application and the website, the user device may store the data in the web-browsing application (e.g., in the software code, Javascript, etc.). The user device may generate a URL associated with the partial application, and the URL may include URL parameters containing the data. The user device may then launch the partial application via the web-browsing application. After the partial application is launched, the partial application may access and use the stored data, based on the URL, to be used by the partial application. In this way, the partial application may indirectly be able to have NFC functionality by accessing information previously received over NFC and stored via another application (e.g., the web-browsing application). Accordingly, memory and/or computing resources of the device may still be conserved by not having the full application installed on the device while still having access to NFC functionality of the device for the partial application.

As indicated above, FIGS. 1A-1C are provided as an example. Other examples may differ from what is described with regard to FIGS. 1A-1C. For example, although example 100 describes launching, via the first NFC device, the partial application after scanning the NFC tag and receiving associated data indicating information stored on the second NFC device, there may be implementations in which the partial application is launched first, and the NFC tag is subsequently scanned, for example, if the partial application requires and/or requests the information stored on the second NFC device.

The user device may execute a web-browsing application installed on the user device, and may scan an NFC tag of another device in connection with a URL opened on the web-browsing application. By way of the scan, the user device may receive, from the other device, some data stored on the other device. In connection with the web-browsing application and the website, the user device may store the data in the web-browsing application (e.g., in the software code, Javascript, etc.). The user device may generate a URL associated with the partial application, and the URL may include URL parameters containing the data. The user device may then launch the partial application via the web-browsing application. After the partial application is launched, the partial application may access and use the stored data, based on the URL, to be used by the partial application. In this way, the partial application may indirectly be able to have NFC functionality by accessing information previously received over NFC and stored via another application (e.g., the web-browsing application). Accordingly, memory and/or computing resources of the device may still be conserved by not having the full application installed on the device while still having access to NFC functionality of the device for the partial application.

Figure 2:
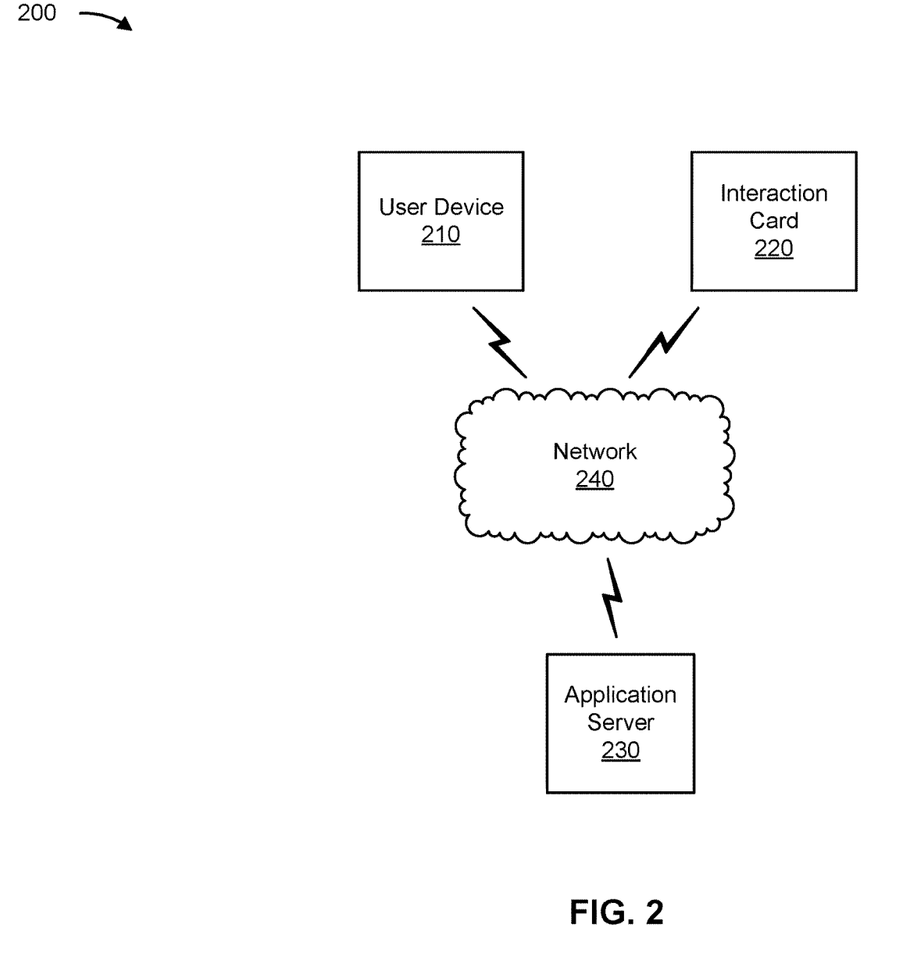
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, an interaction card 220, an application server 230, and a network 240. Devices of environment 200 may interconnect via wired connections, wireless connections, or a combination of wired and wireless connections.

The user device 210 may include one or more devices capable of receiving, generating, storing, processing, and/or providing information associated with NFC functionality for partial applications accessed over a network, as described elsewhere herein. The user device 210 may include a communication device and/or a computing device. For example, the user device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. As described above, the user device 210 may have NFC functionality, as described in more detail below in connection with FIG. 3.

The interaction card 220 may be a device capable of being used for an electronic exchange. The interaction card 220 may include integrated circuitry capable of storing and communicating account information. For example, the interaction card 220 may be a transaction card, such as a credit card, a debit card, a gift card, an ATM card, a transit card, a fare card, and/or an access card. The interaction card 220 may store account information associated with the interaction card 220, which may be used in connection with an electronic exchange. The account information may include, for example, an account identifier that identifies an account (e.g., a bank account or a credit account) associated with the interaction card 220 (e.g., an account number, a card number, a bank routing number, and/or a bank identifier), a cardholder identifier (e.g., identifying a name of a person, business, or entity associated with the account or the interaction card 220), expiration information (e.g., identifying an expiration month and/or an expiration year associated with the interaction card 220), and/or a credential (e.g., a payment token). In some implementations, the interaction card 220 may store the account information in tamper-resistant memory of the interaction card 220, such as in a secure element. As part of performing an electronic exchange, the interaction card 220 may transmit the account information to a device (e.g., a mobile device or a terminal) using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the interaction card 220 and the device may communicate with one another by coming into contact with one another (e.g., using a magnetic stripe or an EMV chip) or via contactless communication (e.g., using NFC).

The application server 230 may include one or more devices capable of receiving, generating, storing, processing, providing, and/or routing information associated with NFC functionality for partial applications accessed over a network, as described elsewhere herein. The application server 230 may include a communication device and/or a computing device. For example, the application server 230 may include a server, such as an application server, a client server, a web server, a database server, a host server, a proxy server, a virtual server (e.g., executing on computing hardware), or a server in a cloud computing system. In some implementations, the application server 230 includes computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
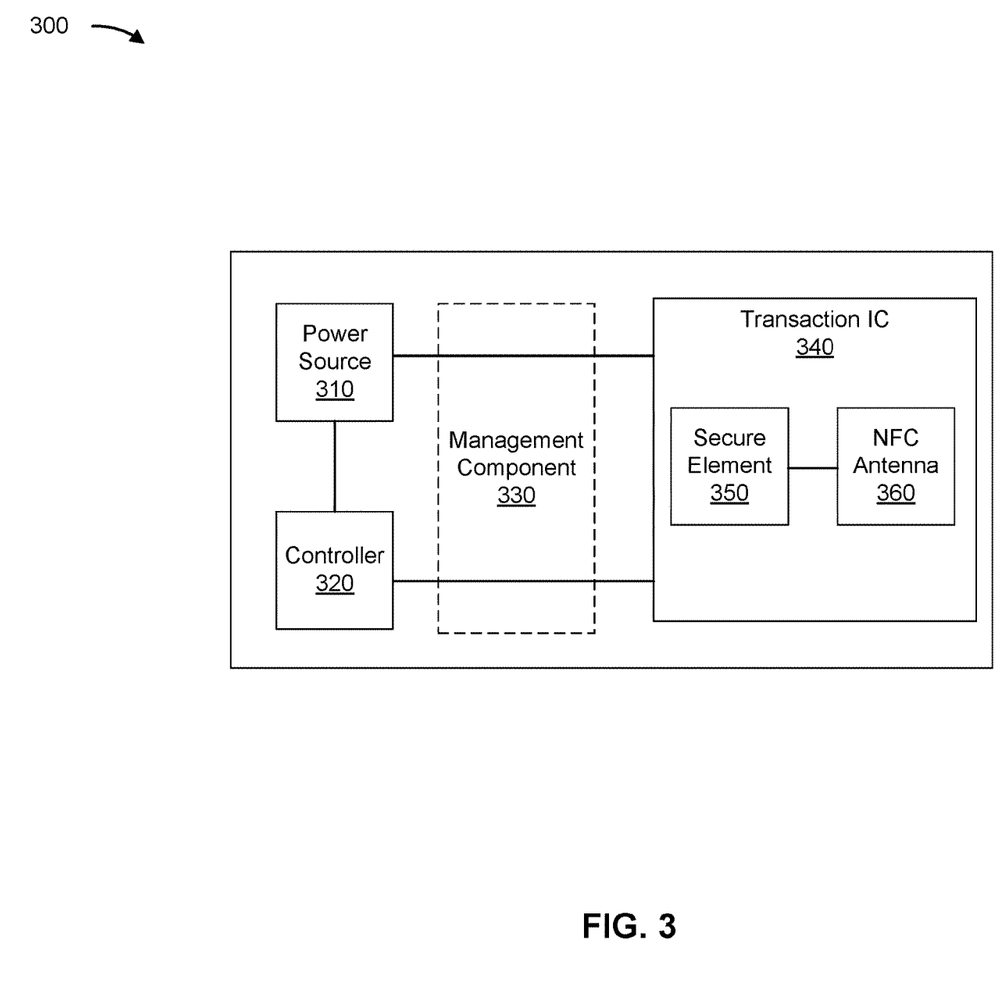
FIG. 3 is a diagram of example components of a device associated with near-field communication functionality for partial applications accessed over a network, in accordance with some embodiments of the present disclosure.

FIG. 3 is a diagram of example components of an NFC device 300 associated with NFC functionality for partial applications accessed over a network. NFC device 300 may correspond to the user device 210 and/or the interaction card 220. In some implementations, user device 210 and/or interaction card 220 may include one or more NFC devices 300 and/or one or more components of NFC device 300. As shown in FIG. 3, NFC device 300 may include a power source 310, a controller 320, a management component 330, a transaction integrated circuit (IC) 340, a secure element 350, and an NFC antenna 360.

Power source 310 may include one or more devices, internal to NFC device 300, capable of supplying power. For example, power source 310 may include a battery (e.g., a rechargeable battery, a non-rechargeable battery, and/or the like), a power supply, a capacitor, and/or the like. In some implementations, NFC device 300 (e.g., controller 320 and/or secure element 350) may obtain power from power source 310 when NFC device 300 is to perform a transaction in a powered mode. In some aspects, NFC device 300 may include a single power source 310, which may supply power for performing a transaction and/or may supply power to one or more other components of NFC device 300 (e.g., a processor, a storage component, an input component, an output component, a communication interface, and/or the like). In some aspects, NFC device 300 may include multiple power sources 310. In some aspects, a single power source 310 may be dedicated to supplying power solely for performing a transaction, while other power sources 310 supply power to other components of NFC device 300.

Controller 320 may include one or more devices capable of receiving, generating, storing, processing, and/or providing information and/or instructions that assist with performing a transaction. For example, controller 320 may include a processor, such as processor 420 described below in connection with FIG. 4. Additionally, or alternatively, controller 320 may include memory, such as memory 430 described below in connection with FIG. 4. In some implementations, the memory may store information associated with performing a transaction (e.g., one or more applications, a configuration for one or more applications, and/or the like), and the controller may provide such information to secure element 350 to perform the transaction (e.g., in a powered mode). In some implementations, controller 320 may receive power from power source 310.

Management component 330 may include one or more devices capable of controlling whether transaction IC 340 (e.g., secure element 350 and/or NFC antenna 360) receives power from power source 310 and/or receives information from controller 320. For example, management component 330 may include a switch, a gate, a controller, a processing component, and/or the like. In some implementations, management component 330 may include a bidirectional logic level shifter to control signals between controller 320 and secure element 350 (e.g., to couple or decouple controller 320 and secure element 350, to prevent signals from being passed between controller 320 and secure element 350, and/or the like). Additionally, or alternatively, management component 330 may include a diode (e.g., an ideal diode) and/or a switch (e.g., a load switch) to control signals between power source 310 and secure element 350 (e.g., to couple or decouple power source 310 and secure element 350, to prevent signals from being passed between power source 310 and secure element 350, and/or the like). In some implementations, management component 330 may couple transaction IC 340 to power source 310 and/or controller 320 when NFC device 300 is to perform a transaction in a powered mode, and/or may decouple transaction IC 340 from power source 310 and/or controller 320 when NFC device 300 is to perform a transaction in an unpowered mode. In some implementations, management component 330 may include a booster to improve transaction speed and/or range of NFC antenna 360 when NFC device 300 performs a transaction in a powered mode.

Transaction IC 340 may include an integrated circuit that connects secure element 350 and NFC antenna 360. For example, transaction IC 340 may include secure element 350, NFC antenna 360, and a connection between secure element 350 and NFC antenna 360.

Secure element 350 may include one or more devices capable of securely hosting an operating system and/or an application, and/or storing confidential information (e.g., a credential, cryptographic information, and/or the like). For example, secure element 350 may include a universal integrated circuit card (UICC), a secure digital (SD) card (e.g., a microSD card and/or the like), an embedded secure element, and/or the like. In some implementations, secure element 350 may include a tamper resistant hardware platform. In some implementations, secure element 350 may host a personalized card application and a cryptographic key required to perform a financial transaction (e.g., with a transaction terminal). In some implementations, secure element 350 may store a credential, such as a username, a password, biometric information, a token, a certificate for signing documents, and/or the like.

NFC antenna 360 may include an antenna capable of transmitting and/or receiving information using an NFC protocol. For example, NFC antenna 360 may include a loop antenna (e.g., an NFC loop antenna), an inductor (e.g., an NFC inductor), and/or the like. In some implementations, NFC antenna 360 may be integrated into secure element 350 (e.g., may be part of the same integrated circuit, such as transaction IC 340).

The number and arrangement of components shown in FIG. 3 are provided as an example NFC device 300 may include additional components, fewer components, different components, or differently arranged components than those shown in FIG. 3. Additionally, or alternatively, a set of components (e.g., one or more components) of NFC device 300 may perform one or more functions described as being performed by another set of components of NFC device 300.

Figure 4:
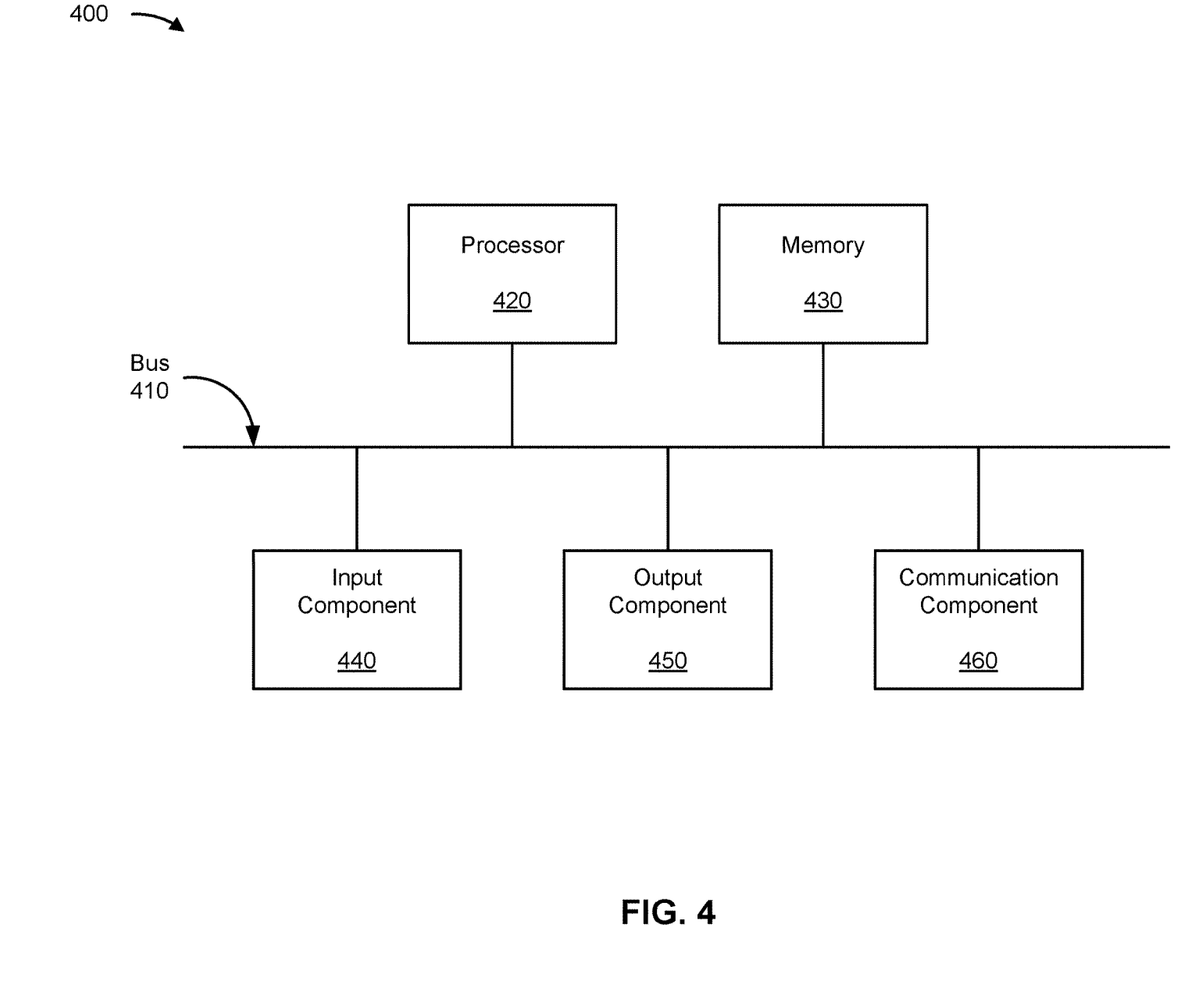
FIG. 4 is a diagram of example components of a device associated with near-field communication functionality for partial applications accessed over a network, in accordance with some embodiments of the present disclosure.

FIG. 4 is a diagram of example components of a device 400 associated with NFC functionality for partial applications accessed over a network. Device 400 may correspond to user device 210, interaction card 220, and/or application server 230. In some implementations, user device 210, interaction card 220, and/or application server 230 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 may enable device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
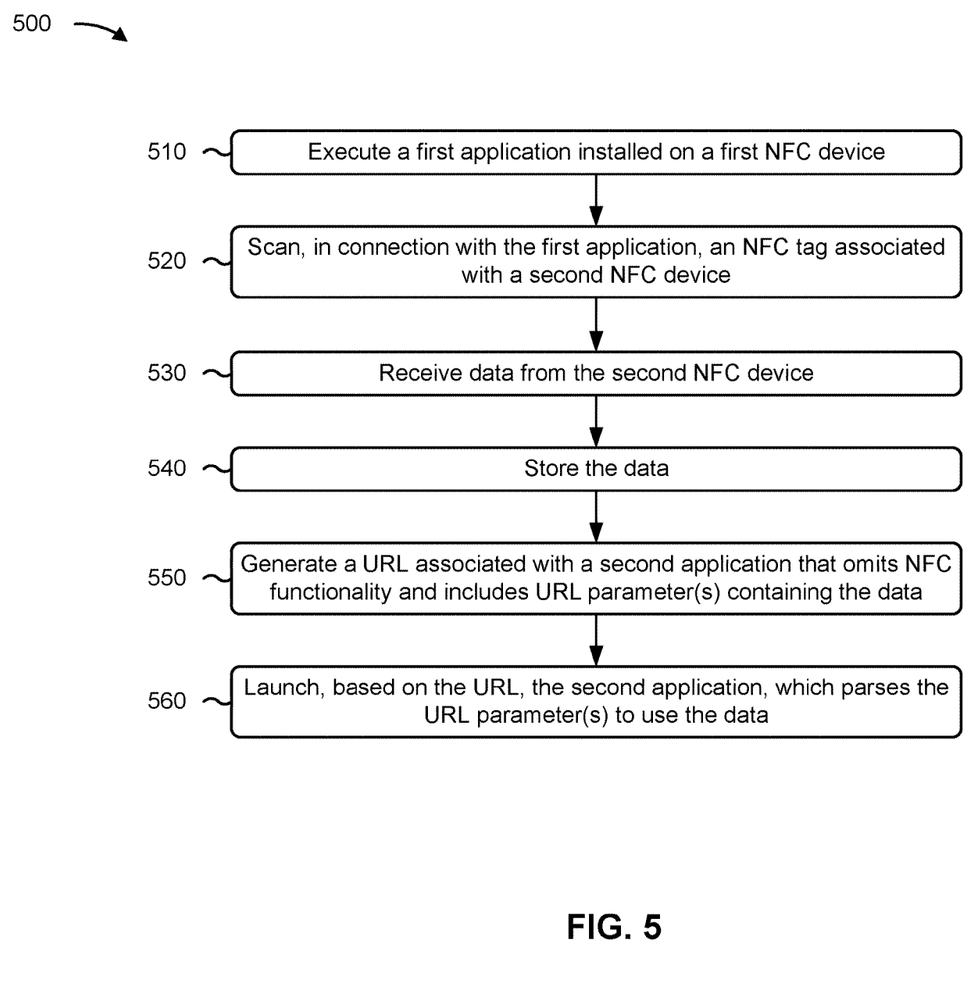
FIG. 5 is a flowchart of an example process associated with near-field communication functionality for partial applications accessed over a network, in accordance with some embodiments of the present disclosure.

FIG. 5 is a flowchart of an example process 500 associated with near-field communication functionality for partial applications accessed over a network. In some implementations, one or more process blocks of FIG. 5 may be performed by the user device 210. In some implementations, one or more process blocks of FIG. 5 may be performed by one or more components of the NFC device 300, such as processor 420, memory 430, input component 440, output component 450, and/or communication component 460.

As shown in FIG. 5, process 500 may include executing a first application installed on a first NFC device (block 510). For example, the user device 210 (e.g., using processor 420 and/or memory 430) may execute a first application installed on user device 210 (e.g., the first NFC device), as described above in connection with reference number 105 of FIG. 1A.

As further shown in FIG. 5, process 500 may include scanning an NFC tag associated with a second NFC device (block 520). For example, the user device 210 (e.g., using processor 420 and/or memory 430) may scan, by an NFC reader of the user device 210 (e.g., the first NFC device) and in connection with executing the first application, an NFC tag associated with a second NFC device, as described above in connection with reference number 115 of FIG. 1A.

As further shown in FIG. 5, process 500 may include receiving data by the first NFC device and from the second NFC device (block 530). For example, the user device 210 (e.g., using processor 420, memory 430, input component 440, and/or communication component 460) may receive data from the second NFC device, as described above in connection with reference number 120 of FIG. 1A.

As further shown in FIG. 5, process 500 may include storing the data (block 540). For example, the user device 210 (e.g., using processor 420 and/or memory 430) may store the data, as described above in connection with reference number 125 of FIG. 1A.

As further shown in FIG. 5, process 500 may include generating a URL associated with a second application that omits (i.e., does not have) NFC functionality and that includes one or more URL parameters containing the data (block 550). For example, the user device 210 (e.g., using processor 420 and/or memory 430) may generate a URL associated with a second application accessible over the network, wherein the second application may omit NFC functionality and may include one or more URL parameters containing the data, as described above in connection with reference number 130 of FIG. 1B.

As further shown in FIG. 5, process 500 may include launching, based on the URL, the second application, which may parse the URL parameter(s) to use the data (block 560). For example, the user device 210 (e.g., using processor 420 and/or memory 430) may launch, based on the URL, the second application, wherein the second application may parse the URL parameter(s) to use the data, as described above in connection with reference numbers 135 and 140 of FIG. 1C.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A near-field communication (NFC) device to provide NFC functionality for partial applications accessed over a network, the NFC device comprising:
   an NFC reader;
   one or more memories; and
   one or more processors, communicatively coupled to the one or more memories, configured to:
      execute a web-browsing application installed on the one or more memories;
      scan, by the NFC reader and in connection with the web-browsing application, an NFC tag of an interaction card associated with an account of a user;
      receive, from the interaction card, data associated with the account of the user;
      store the data as coded data in the web-browsing application;
      generate a uniform resource locator (URL) associated with a partial application,
         wherein the partial application has reduced functionality compared to a full version of the partial application, and
         wherein the URL includes one or more URL parameters containing the coded data; and
      launch the partial application, over the network, based on a user interaction with a hyperlink presented in the web-browsing application and associated with the URL, wherein the partial application parses the one or more URL parameters and decodes the coded data to be used by the partial application.

2. The NFC device of claim 1, wherein the data indicates an authentication credential associated with the user or the account of the user.

3. The NFC device of claim 1, wherein the data indicates account information associated with the account.

4. The NFC device of claim 3, wherein the account information includes an account identifier associated with the account.

5. The NFC device of claim 1, wherein the one or more processors are configured to store the data temporarily.

6. A method of providing near-field communication (NFC) functionality for applications accessed over a network, comprising:
   executing, by a first NFC device having one or more processors, a first application installed on the first NFC device;
   scanning, by an NFC reader of the first NFC device and in connection with executing the first application, an NFC tag associated with a second NFC device;
   receiving data by the first NFC device and from the second NFC device;
   storing, by the first NFC device, the data;
   generating, by the first NFC device, a uniform resource locator (URL) associated with a second application accessible over the network,
      wherein the second application omits NFC functionality, and
      wherein the URL includes one or more URL parameters containing the data; and
   launching, by the first NFC device and based on the URL, the second application,
      wherein the second application parses the one or more URL parameters to use the data.

7. The method of claim 6, wherein the first application is a web-browsing application.

8. The method of claim 6, wherein storing the data comprises:
   storing the data in software code associated with the first application.

9. The method of claim 6, wherein storing the data comprises:
   storing the data temporarily in connection with the first application.

10. The method of claim 6, wherein the second NFC device is an interaction card associated with an account of a user.

11. The method of claim 10, wherein the data is associated with the account of the user.

12. The method of claim 11, wherein the data indicates an authentication credential associated with the user or the account of the user.

13. The method of claim 11, wherein the data indicates an account identifier associated with the account of the user.

14. A non-transitory computer-readable medium storing a set of instructions, the set of instructions comprising:
   one or more instructions that, when executed by one or more processors of a first near-field communication (NFC) device, cause the device to:
      execute a web-browsing application installed on the first NFC device;
      scan, by an NFC reader of the first NFC device and in connection with the web-browsing application, an NFC tag of a second NFC device;
      receive data from the second NFC device and based on scanning the NFC tag;
      store the data in connection with the web-browsing application;
      generate a uniform resource locator (URL) associated with a partial application and with the data,
         wherein the partial application is accessible over a network,
         wherein the partial application has reduced functionality compared to a full version of the partial application, and
         wherein the reduced functionality omits NFC functionality;
      detect a user interaction with a hyperlink presented in the web-browsing application and associated with the URL; and
      launch the partial application based on the user interaction with the hyperlink, wherein the partial application accesses the data via the URL.

15. The non-transitory computer-readable medium of claim 14, wherein storing the data comprises:
   storing the data in software code associated with the web-browsing application.

16. The non-transitory computer-readable medium of claim 14, wherein storing the data comprises:
   storing the data temporarily in connection with the web-browsing application.

17. The non-transitory computer-readable medium of claim 14, wherein the second NFC device is an interaction card associated with an account of a user.

18. The non-transitory computer-readable medium of claim 17, wherein the data is associated with the account of the user.

19. The non-transitory computer-readable medium of claim 18, wherein the data indicates an authentication credential associated with the user or the account of the user.

20. The non-transitory computer-readable medium of claim 18, wherein the data indicates an account identifier associated with the account of the user.

* * * * *